United States Patent
Newman

(10) Patent No.: US 11,457,764 B2
(45) Date of Patent: Oct. 4, 2022

(54) PORTABLE COFFEE BREWING MUG APPARATUS

(71) Applicant: Rohalio Newman, Puyallup, WA (US)

(72) Inventor: Rohalio Newman, Puyallup, WA (US)

( * ) Notice: Subject to any disclaimer, the term of this patent is extended or adjusted under 35 U.S.C. 154(b) by 275 days.

(21) Appl. No.: 17/003,497

(22) Filed: Aug. 26, 2020

(65) Prior Publication Data

US 2022/0061577 A1 Mar. 3, 2022

(51) Int. Cl.
*A47J 31/00* (2006.01)
*A47J 31/02* (2006.01)
*A47J 31/053* (2006.01)

(52) U.S. Cl.
CPC .......... *A47J 31/005* (2013.01); *A47J 31/02* (2013.01); *A47J 31/053* (2013.01)

(58) Field of Classification Search
CPC ......... A47J 31/005; A47J 31/02; A47J 31/053
See application file for complete search history.

(56) References Cited

U.S. PATENT DOCUMENTS

| | | |
|---|---|---|
| 3,813,517 A | 5/1974 | McGruder |
| D336,825 S | 1/1993 | Ivey |
| 6,864,462 B2 | 3/2005 | Sanoner |
| 8,584,576 B2 * | 11/2013 | Fogg, IV .............. A47J 31/005 99/320 |
| 9,801,482 B1 * | 10/2017 | Alexander ......... A47G 19/2288 |
| 10,219,647 B2 * | 3/2019 | Richardson ........... A47J 31/057 |
| 10,702,090 B2 * | 7/2020 | Liu ...................... A47J 31/005 |
| 2007/0221067 A1 * | 9/2007 | Scelza .................. A47J 31/005 99/279 |
| 2018/0139979 A1 | 5/2018 | Glynn |
| 2020/0054161 A1 * | 2/2020 | Zhu ....................... A47J 31/053 |

FOREIGN PATENT DOCUMENTS

WO    WO2018107627    6/2018

* cited by examiner

*Primary Examiner* — Omar Flores Sanchez

(57) ABSTRACT

A portable coffee brewing mug apparatus for brewing and consuming fresh coffee on the go includes a cup body. A cup riser tube extends from a cup top perimeter down through a cup sidewall and into a cup interior adjacent a cup base. A heating element powered by a cup battery is coupled within the cup base. A brewing module is selectively engageable with the cup body and has a pod holder to secure a coffee pod. A module riser tube is in fluid communication with the cup riser tube and a drip tube to bring heated water from the cup body onto the coffee pod. A base body has a base top side selectively receiving the cup base. A charger is coupled within the base body and is in operational communication with the cup battery.

11 Claims, 4 Drawing Sheets

PORTABLE COFFEE BREWING MUG APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to coffee machine device and more particularly pertains to a new coffee machine device for brewing and consuming fresh coffee on the go.

(2) Description of Related Art including information disclosed under 37 CFR 1.97 and 1.98

The prior art relates to coffee machine devices. Existing devices brew coffee in a variety of different ways similar to steeping and French press. These devices, however, do not function with coffee pods. Most known devices also lack a removable charging base and separate brewing module.

BRIEF SUMMARY OF THE INVENTION

An embodiment of the disclosure meets the needs presented above by generally comprising a cup body, the cup body having a cup base and a cup sidewall extending from the cup base and defining a cup interior. The cup sidewall has a cup top perimeter. A cup riser tube extends from the cup top perimeter down through the cup sidewall and into the cup interior adjacent the cup base. A heating element is coupled to the cup body within the cup base adjacent the cup interior. A cup battery is coupled to the cup body within the cup base and is in operational communication with the heating element. A brewing module has a module bottom and a module sidewall coupled to the module bottom. The module sidewall has a module top perimeter. The module bottom is selectively engageable with the cup top perimeter. A pod holder is coupled to the brewing module above a brew aperture extending through the module bottom. The pod holder is configured to secure a coffee pod. A module riser tube is coupled to the brewing module. The module riser tube extends through the module bottom to be in fluid communication with the cup riser tube. A module lid is coupled to the brewing module. The module lid is selectively engageable with the module top perimeter and has a drip tube in fluid communication with the module riser tube. The drip tube extends through the module lid to a drip aperture above the pod holder. A base body has a base top side selectively receiving the cup base. A charger is coupled within the base body and is in operational communication with the cup battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
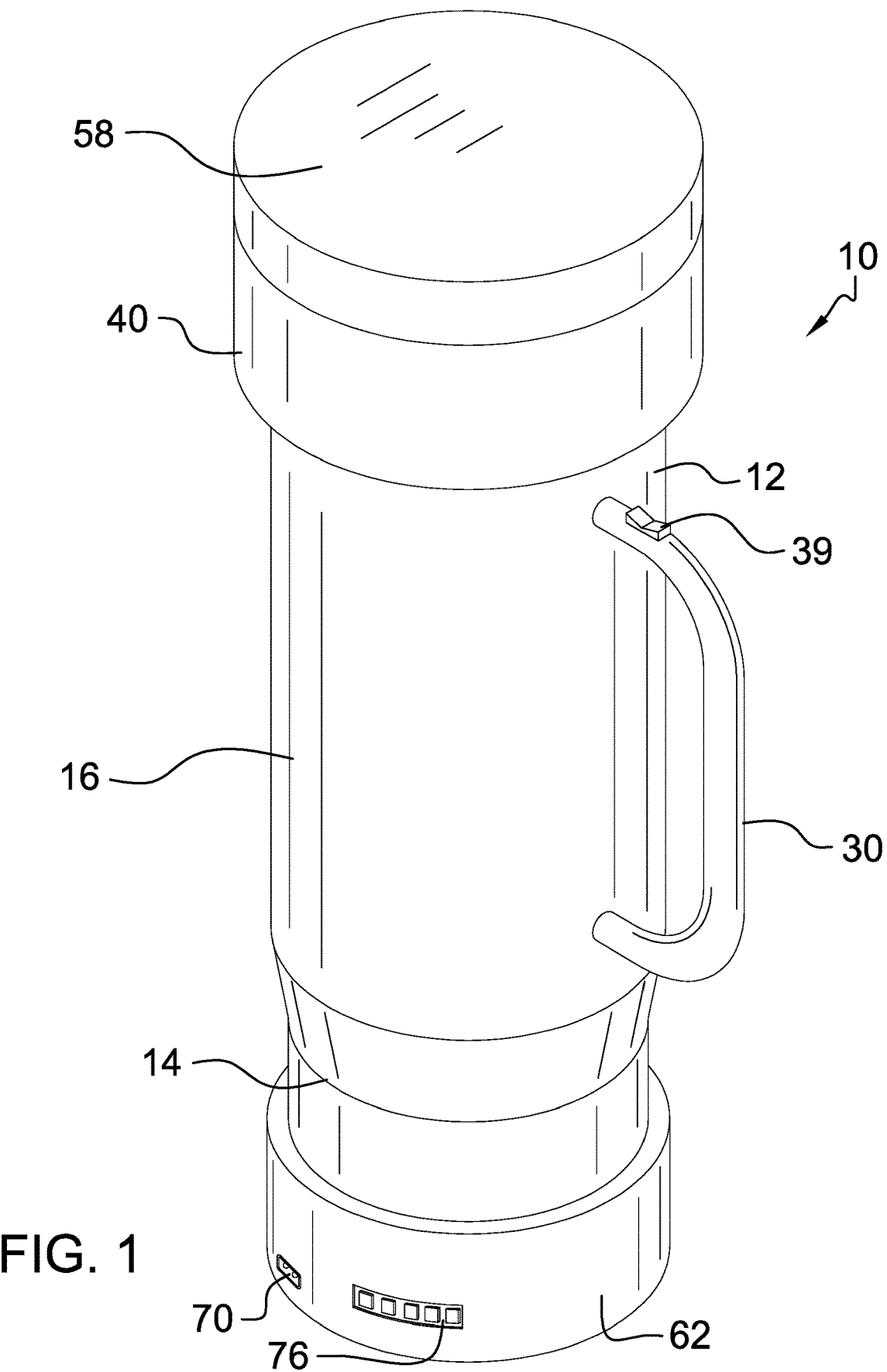
FIG. 1 is an isometric view of a portable coffee brewing mug apparatus according to an embodiment of the disclosure.
Figure 2:
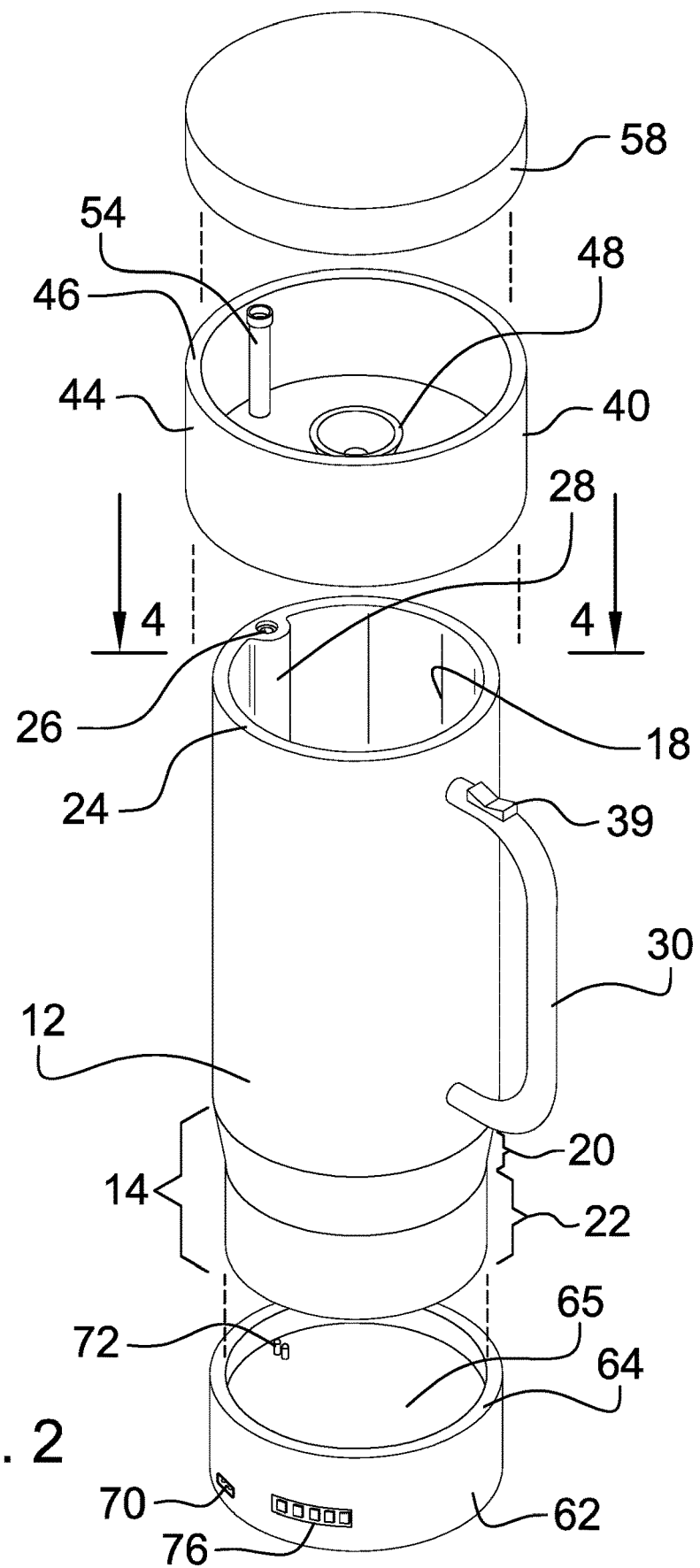
FIG. 2 is an exploded view of an embodiment of the disclosure.

With reference now to the drawings, and in particular to FIGS. 1 through 4 thereof, a new coffee machine device embodying the principles and concepts of an embodiment of the disclosure and generally designated by the reference numeral 10 will be described.

Figure 3:
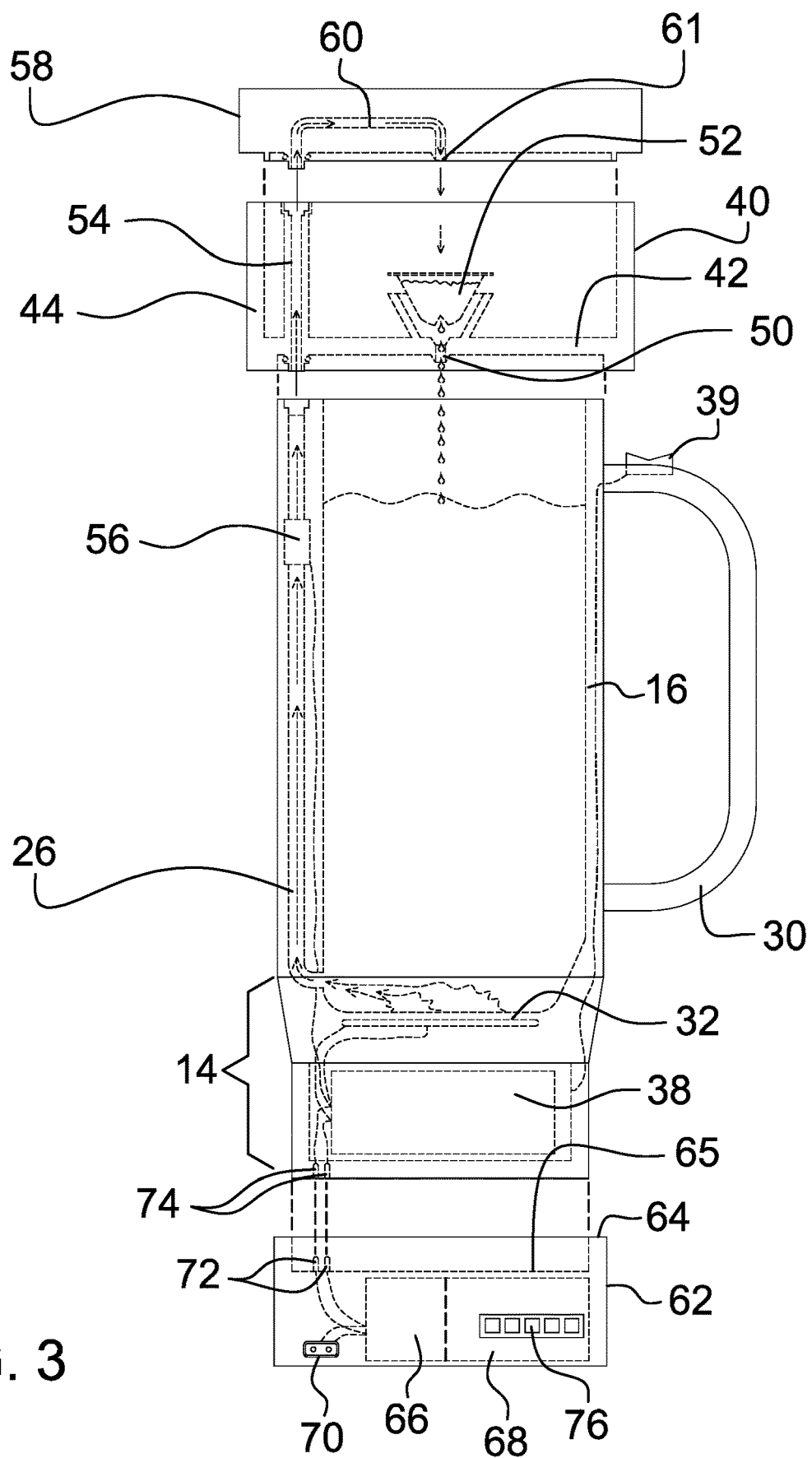
FIG. 3 is a front elevation view of an embodiment of the disclosure.
Figure 4:
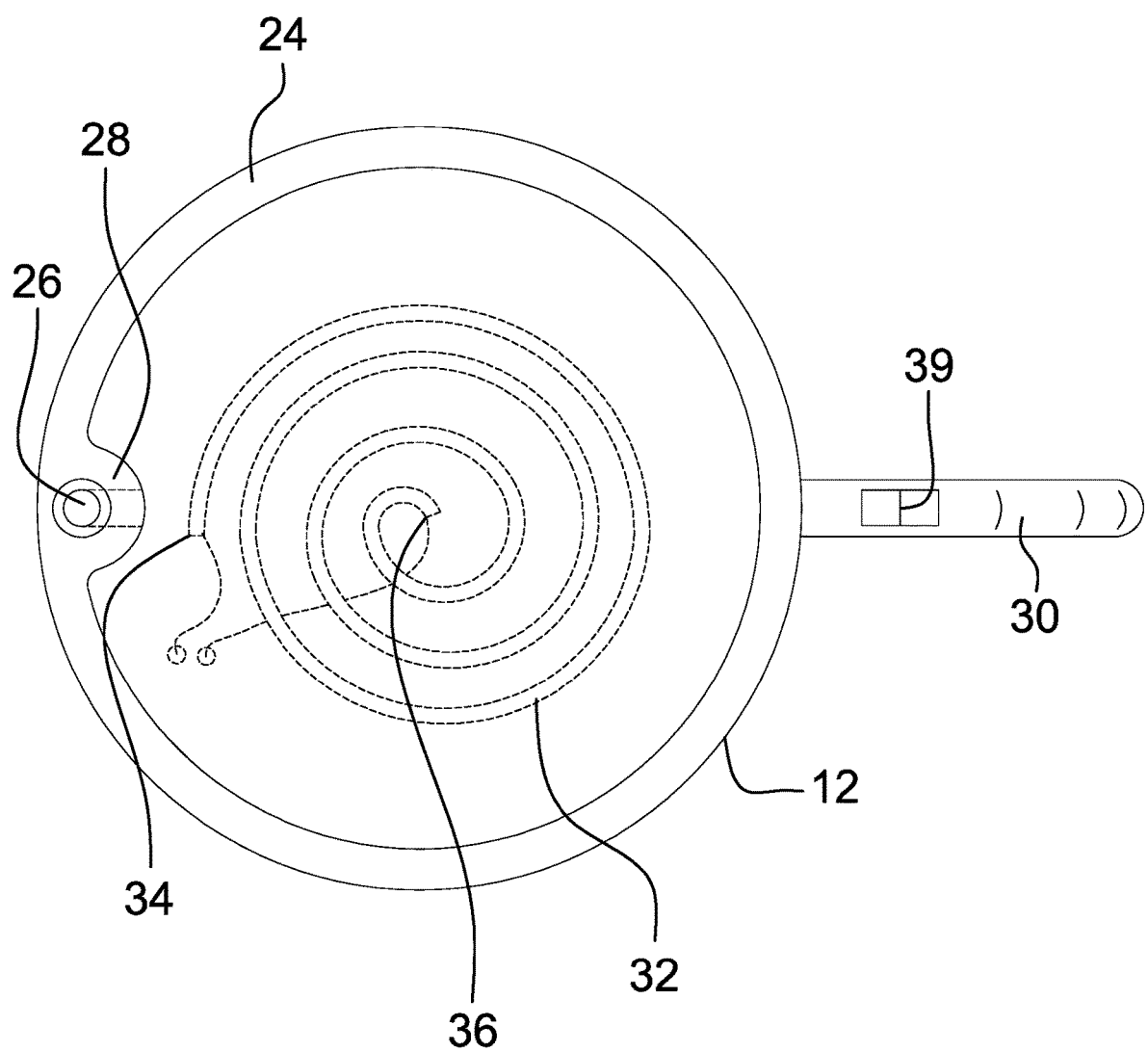
FIG. 4 is a top plan view of an embodiment of the disclosure.

As best illustrated in FIGS. 1 through 4, the portable coffee brewing mug apparatus 10 generally comprises a cup body 12 having a cup base 14 and a cup sidewall 16 extending from the cup base 14 and defining a cup interior 18. The cup base 14 has a tapered upper portion 20 and a cylindrical lower portion 22. The cup sidewall 16 has a cup top perimeter 24. A cup riser tube 26 extends from the cup top perimeter 24 down through the cup sidewall 16 and into the cup interior 18 adjacent the cup base 14 as seen in FIG. 3. The cup sidewall 16 may have a protrusion portion 28 with the cup riser tube 26 extending through the protrusion portion 28. A handle 30 may be coupled to the cup body 12.

A heating element 32 is coupled to the cup body 12. The heating element 32 is coupled within the cup base 14 adjacent the cup interior 18. The heating element 32 may be a resistive coil having a coil first end 34 and a coil second end 36. A cup battery 38 is coupled within the cup base 14 and is in operational communication with each of the coil first end 34 and the coil second end 36 of the heating element. A power switch 39 is coupled to the handle 30 and is in operational communication with the heating element 32.

A brewing module 40 has a module bottom 42 and a module sidewall 44 coupled to the module bottom 42. The module sidewall 44 has a module top perimeter 46. The module bottom 42 is selectively engageable with the cup top perimeter 24. A pod holder 48 is coupled to the brewing module 40 above a brew aperture 50 extending through the module bottom 42. The pod holder 48 may be conical and is configured to secure a coffee pod 52.

A module riser tube 54 is coupled to the brewing module 40. The module riser tube 54 extends through the module bottom 42 to be in fluid communication with the cup riser tube 26. A pump 56 may be coupled within the cup riser tube 26 to provide sufficient pressure moving hot water from the cup interior 18 into the module riser tube 54. The pump 56 is in operational communication with the cup battery 38.

A module lid 58 is coupled to the brewing module 40 and is selectively engageable with the module top perimeter 46. The module lid 58 has a drip tube 60 in fluid communication with the module riser tube 54. The drip tube 60 extends through the module lid 58 to a drip aperture 61 above the pod holder 48.

A base body 62 has a base top side 64 with a recessed portion 65 to selectively receive the cup base 14. A charger 66 is coupled within the base body 62 and is in operational communication with the cup battery 38. The charger 66 may include a charger battery 68 and a charge port 70 extending through the base body 62. The charger 66 may have a pair of charging contacts 72 coupled within the recessed portion 66 and in operational communication with a contact receptacle 74 of the cup base. The contact receptacle 74 is in operational communication with the cup battery 38. An array of charge indicator lights 76 is coupled to the base body 62 and is in operational communication with the charger battery 68 to show charge status of the charger battery 68 and the cup battery 38.

In use, the cup interior 18 is filled with water and the power switch 39 is engaged to activate the heating element 32 and the pump 56. Hot water then flows up the cup riser tube 26, into the module riser tube 54, and through the drip tube 60 to flow through the coffee pod 52 and the brew aperture 50 back into the cup interior 18. The brewing module 40 is then removed to drink the coffee once brewed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable coffee brewing mug apparatus comprising:
   a cup body, the cup body having a cup base and a cup sidewall extending from the cup base and defining a cup interior, the cup sidewall having a cup top perimeter, a cup riser tube extending from the cup top perimeter down through the cup sidewall and into the cup interior adjacent the cup base;
   a heating element coupled to the cup body, the heating element being coupled within the cup base adjacent the cup interior;
   a cup battery coupled to the cup body, the cup battery being coupled within the cup base and being in operational communication with the heating element;
   a brewing module having a module bottom and a module sidewall coupled to the module bottom, the module sidewall having a module top perimeter, the module bottom being selectively engageable with the cup top perimeter;
   a pod holder coupled to the brewing module, the pod holder being coupled above a brew aperture extending through the module bottom, the pod holder being configured to secure a coffee pod;
   a module riser tube coupled to the brewing module, the module riser tube extending through the module bottom to be in fluid communication with the cup riser tube;
   a module lid coupled to the brewing module, the module lid being selectively engageable with the module top perimeter and having a drip tube in fluid communication with the module riser tube, the drip tube extending through the module lid to a drip aperture above the pod holder;
   a base body, the base body having a base top side selectively receiving the cup base; and
   a charger coupled to the base body, the charger being coupled within the base body and being in operational communication with the cup battery.

2. The portable coffee brewing mug apparatus of claim 1 further comprising a pump coupled within the cup riser tube, the pump being in operational communication with the cup battery.

3. The portable coffee brewing mug apparatus of claim 1 further comprising a handle coupled to the cup body; a power switch coupled to the handle, the power switch being in operational communication with the heating element.

4. The portable coffee brewing mug apparatus of claim 1 further comprising the charger including a charger battery and a charge port extending through the base body.

5. The portable coffee brewing mug apparatus of claim 4 further comprising an array of charge indicator lights coupled to the base body, the array of charge indicator lights being in operational communication with the charger battery.

6. The portable coffee brewing mug apparatus of claim 1 further comprising the base top side having a recessed portion; the charger having a pair of charging contacts coupled within the recessed portion, the pair of charging contacts being in operational communication with a contact receptacle of the cup base.

7. The portable coffee brewing mug apparatus of claim 1 further comprising the cup base having a tapered upper portion and a cylindrical lower portion.

8. The portable coffee brewing mug apparatus of claim 1 further comprising the cup sidewall having a protrusion portion, the cup riser tube extending through the protrusion portion.

9. The portable coffee brewing mug apparatus of claim 1 further comprising the heating element being a resistive coil.

10. The portable coffee brewing mug apparatus of claim 1 further comprising the pod holder being conical.

11. A portable coffee brewing mug apparatus comprising:
- a cup body, the cup body having a cup base and a cup sidewall extending from the cup base and defining a cup interior, the cup base having a tapered upper portion and a cylindrical lower portion, the cup sidewall having a cup top perimeter, a cup riser tube extending from the cup top perimeter down through the cup sidewall and into the cup interior adjacent the cup base, the cup sidewall having a protrusion portion, the cup riser tube extending through the protrusion portion;
- a handle coupled to the cup body;
- a heating element coupled to the cup body, the heating element being coupled within the cup base adjacent the cup interior, the heating element being a resistive coil;
- a power switch coupled to the handle, the power switch being in operational communication with the heating element;
- a cup battery coupled to the cup body, the cup battery being coupled within the cup base and being in operational communication with the heating element;
- a brewing module having a module bottom and a module sidewall coupled to the module bottom, the module sidewall having a module top perimeter, the module bottom being selectively engageable with the cup top perimeter;
- a pod holder coupled to the brewing module, the pod holder being coupled above a brew aperture extending through the module bottom, the pod holder being conical and being configured to secure a coffee pod;
- a module riser tube coupled to the brewing module, the module riser tube extending through the module bottom to be in fluid communication with the cup riser tube;
- a pump coupled within the cup riser tube, the pump being in operational communication with the cup battery;
- a module lid coupled to the brewing module, the module lid being selectively engageable with the module top perimeter and having a drip tube in fluid communication with the module riser tube, the drip tube extending through the module lid to a drip aperture above the pod holder;
- a base body, the base body having a base top side having a recessed portion selectively receiving the cup base;
- a charger coupled to the base body, the charger being coupled within the base body and being in operational communication with the cup battery, the charger including a charger battery and a charge port extending through the base body, the charger having a pair of charging contacts coupled within the recessed portion, the pair of charging contacts being in operational communication with a contact receptacle of the cup base, the contact receptacle being in operational communication with the cup battery; and
- an array of charge indicator lights coupled to the base body, the array of charge indicator lights being in operational communication with the charger battery.

* * * * *